(12) United States Patent
Natsui et al.

(10) Patent No.: US 7,725,243 B2
(45) Date of Patent: May 25, 2010

(54) CONTROL APPARATUS OF CYLINDER INJECTION TYPE INTERNAL COMBUSTION ENGINE

(75) Inventors: Hiroyuki Natsui, Hino (JP); Yoshihiro Sukegawa, Hitachi (JP); Yusuke Kihara, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 12/130,510

(22) Filed: May 30, 2008

(65) Prior Publication Data

US 2009/0063021 A1 Mar. 5, 2009

(30) Foreign Application Priority Data

May 31, 2007 (JP) ............................. 2007-144347

(51) Int. Cl.
*F02D 41/34* (2006.01)
*F02D 41/30* (2006.01)
*G06F 19/00* (2006.01)

(52) U.S. Cl. ..................................... 701/105; 123/90.11

(58) Field of Classification Search ................. 701/105, 701/101–103, 115; 123/90.11, 90.15, 90.16, 123/90.17, 316
See application file for complete search history.

(56) References Cited

U.S. PATENT DOCUMENTS

| | | | | |
|---|---|---|---|---|
| 4,633,403 A | * | 12/1986 | Asmus | .......................... 701/105 |
| 6,405,706 B1 | * | 6/2002 | Hammoud et al. | ........ 123/90.11 |
| 7,325,521 B1 | * | 2/2008 | Leiby et al. | ............... 123/90.15 |
| 7,472,685 B2 | * | 1/2009 | Tanabe et al. | ................ 701/108 |

FOREIGN PATENT DOCUMENTS

| JP | 2000-8915 A | 1/2000 |
|---|---|---|
| JP | 2002-327651 A | 11/2002 |
| JP | 2004-316449 A | 11/2004 |
| JP | 2006-132398 A | 5/2006 |

OTHER PUBLICATIONS

Notice of Reason for Rejection with English translation (Seven (7) pages).

* cited by examiner

*Primary Examiner*—Hieu T Vo
(74) *Attorney, Agent, or Firm*—Crowell & Moring LLP (57) ABSTRACT

An object of the invention is to reduce an HC generated in a so-called fast idle period in which an engine and a catalyst are warmed up, stabilize a combustion and achieve an early activation of the catalyst, at a cold starting time of a cylinder injection type engine. In a control apparatus controlling a cylinder injection type internal combustion engine directly feeding a fuel into a combustion chamber by a fuel injection apparatus attached to a portion near an intake valve, the control apparatus controls the fuel injection apparatus so as to carry out an intake stroke injection, makes a lift amount of an intake valve smaller than a lift amount at a time of a high load, and controls such that an opening timing of the intake valve comes closer to an intake stroke side near an intake top dead center, in a fast idle period of the cylinder injection type internal combustion engine.

6 Claims, 10 Drawing Sheets

CONTROL APPARATUS OF CYLINDER INJECTION TYPE INTERNAL COMBUSTION ENGINE

BACKGROUND OF THE INVENTION (1) Field of the Invention

The present invention relates to a cylinder injection type engine directly feeding a fuel to a combustion chamber by an injector.

(2) Description of Related Art

As described in patent document 1 (JP-A-2006-132398), there is disclosed a control technique of a dual injection type internal combustion engine which can intend to stabilize a combustion after a cold start of an engine and can reduce an unburned fuel (hereinafter, refer to as HC) and can warm up a catalyst in an early timing, by delaying an opening timing of an intake valve, making a lift amount of the intake valve small, and feeding the fuel by both of an injector injecting the fuel to an intake port and an injector injecting the fuel to an inner side of the cylinder.

Further, as described in patent document 2 (JP-A-2000-8915), there is disclosed a technique of a cylinder injection type internal combustion engine which reduces the HC by controlling an opening timing of an intake valve and a fuel injection timing, forming a flow by an intake air within a combustion chamber by making a lift amount small, and suppressing a fuel attachment to a piston crowned face and a cylinder wall surface at a time of warming up.

Since the warm-up of the catalyst is not finished just after starting at a cold time of the engine, a processing capacity (a purifying capacity) of the catalyst is not sufficient. Accordingly, it is demanded to reduce the HC generated until the warm-up of the catalyst is finished, and activate the catalyst in an early time.

The technique described in the patent document 1 is the technique relating to the dual injection type internal combustion engine mounting both the injector injecting the fuel to the intake port and the injector injecting the fuel into the cylinder therein, and since the opening timing of the intake valve is delayed and a flow rate toward a piston direction is enlarged, a fuel attaching amount to the piston crowned face is large.

Further, in the technique described in the patent document 2, a flow of the intake air is slow in the case that a lift amount of the intake valve is equal to (larger than) the normal one, and it is impossible to sufficiently suppress a fuel attachment to a cylinder bore wall surface. In the case that the lift amount of the intake valve is made small, and the valve opening timing is delayed, the flow of the intake air heading for the piston direction becomes strong, the fuel attachment to the piston crowned face is much, and the generation of the HC is increased.

BRIEF SUMMARY OF THE INVENTION

An object of the present invention is to reduce an HC generated in a so-called fast idle period in which an engine and a catalyst are warmed up, stabilize a combustion and achieve an early activation of the catalyst, at a cold starting time of a cylinder injection type engine.

In accordance with the present invention, there is provided a control apparatus controlling a cylinder injection type internal combustion engine directly feeding a fuel into a combustion chamber by a fuel injection apparatus attached to a portion near an intake valve (particularly a so-called side injection position), wherein the control apparatus controls the fuel injection apparatus so as to carry out an intake stroke injection, makes a lift amount of an intake valve smaller than a lift amount at a time of a high load, and controls such that an opening timing of the intake valve comes closer to an intake stroke side near an intake top dead center, in a fast idle period of the cylinder injection type internal combustion engine.

Further, in accordance with the present invention, there is provided a control apparatus controlling a cylinder injection type internal combustion engine directly feeding a fuel into a combustion chamber by a fuel injection apparatus attached to a portion near an intake valve, wherein the control apparatus controls the fuel injection apparatus so as to carry out an intake stroke injection, makes a lift amount of an intake valve smaller than a lift amount at a time of a high load, and controls an opening timing of the intake valve in a first stage of a fast idle period so as to come closer to an advance side than a second stage of the fast idle period, in the fast idle period of the cylinder injection type internal combustion engine.

Further, it is preferable that the control apparatus controls the opening timing of the intake valve in the first stage of the fast idle period so as to come closer to the advance side, and thereafter controls in stages or continuously to a delay side in correspondence to an operating time of the internal combustion engine.

Further, it is preferable that the control apparatus varies an ignition timing by controlling an ignition apparatus, and delays the ignition timing as well as delaying the valve opening timing of the intake valve.

Further, it is preferable that the control apparatus decides the opening timing of the intake valve in correspondence to a water temperature.

Further, in accordance with the present invention, there is provided a control apparatus controlling a cylinder injection type internal combustion engine directly feeding a fuel into a combustion chamber by a fuel injection apparatus attached to a portion near an intake valve, wherein the control apparatus controls the fuel injection apparatus so as to carry out an intake stroke injection, makes a lift amount of the intake valve smaller than a lift amount at a time of a high load, and controls an opening timing of the intake valve so as to come to 0 degree to 15 degree after an intake top dead center, in a fast idle period of the cylinder injection type internal combustion engine.

In accordance with the present invention, it is possible to stabilize the combustion at a time of warming up the catalyst and activate the catalyst in an early time, as well as reducing the HC attached to the piston wall surface during the fast idle period.

Other objects, features and advantages of the invention will become apparent from the following description of the embodiments of the invention taken in conjunction with the accompanying drawings.

DETAILED DESCRIPTION OF THE INVENTION

Figure 2:
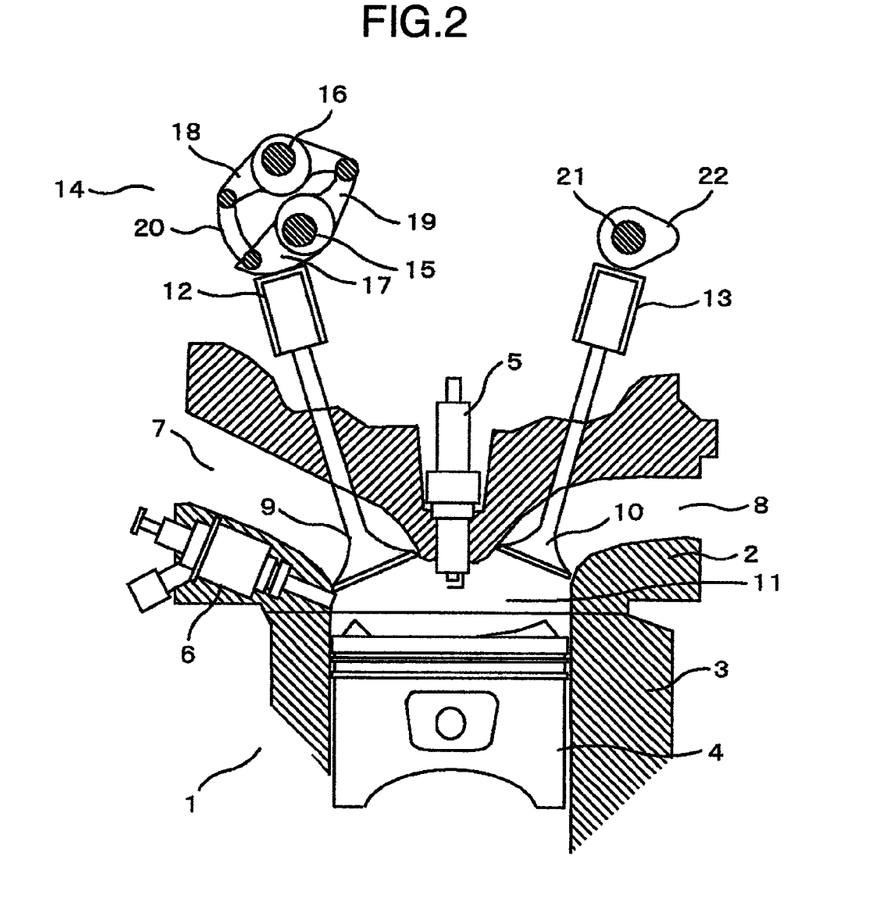
FIG. 2 is a schematic view of a cylinder injection type internal combustion engine.

One example of a cylinder injection engine to which the present invention is applied is shown in FIG. 2.

A cylinder injection engine 1 is provided with an engine head 2, a cylinder block 3, and a piston 4 reciprocating in an inner portion of the cylinder block 3. An ignition plug 5 is arranged in a center portion of a combustion chamber 11 surrounded by the cylinder head 2, the cylinder block 3 and the piston 4, and an injector 6 directly injection feeding a fuel to an inner portion of the combustion chamber 11 is arranged between two intake valves 9 provided within the combustion chamber.

An intake pipe 7 and an exhaust pipe 8 which communicate with the combustion chamber 11 are formed in the cylinder head 2, and flow paths between the combustion chamber 11, and the intake pipe 7 and the exhaust pipe 8 are respectively opened and closed by an intake valve 9 and an exhaust valve 10.

An intake side valve lifter 12 attached to an upper portion of the intake valve 9 is pressed to a lower side by an oscillating cam 17, whereby the intake valve 9 is driven so as to be opened and closed.

A driving portion of the intake valve 9 is provided with a variable lift mechanism 14 in detail mentioned later, whereby it is possible to continuously change a lift amount and an operating angle of the intake valve 9.

The variable lift mechanism 14 is constructed by a drive shaft 15, a control shaft 16, the oscillating cam 17, a rocker arm 18, a link arm 19 and a link member 20, and the drive shaft 15 rotates, and oscillates the rocker arm 18 via the link arm 19, whereby the variable lift mechanism 14 accordingly oscillates via the link member 20.

The control shaft 16 is provided with a control cam which is eccentrically attached to the control shaft 16, and an oscillation supporting point position of the rocker arm 18 is changed by rotating the control cam, whereby an amount of oscillation of the oscillating cam 17 is changed.

Figure 3:
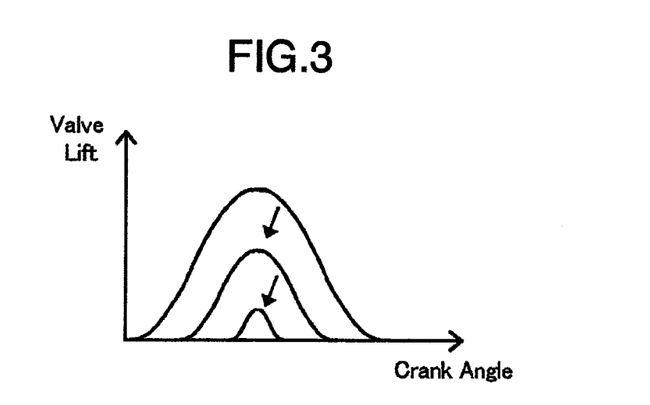
FIG. 3 is a valve lift curve in accordance with a variable valve lift mechanism control.

FIG. 3 shows one example of a valve lift curve at a time of changing the lift amount of the intake valve 9 by the variable lift mechanism 14.

Further, the present embodiment is provided with a known variable valve timing mechanism (not shown) changing a phase of the drive shaft 15, and is structured such that an opening and closing valve timing of the intake valve 9 can be changed.

The exhaust valve 10 is structured such that an exhaust gas side valve lifter 13 attached to an upper portion is pressed by an exhaust cam 22 so as to be lifted. The exhaust cam 22 is attached to an exhaust gas side cam shaft 21.

Figure 4:
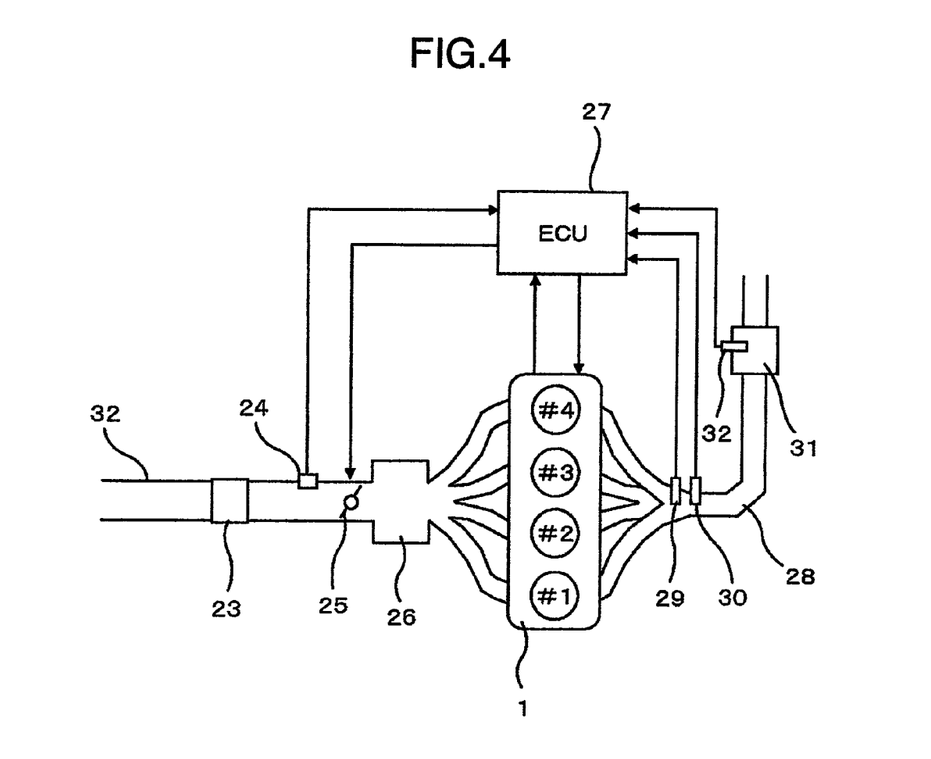
FIG. 4 is a schematic view of an outline structure of a cylinder injection type internal combustion engine.

FIG. 4 shows an outline structure of a cylinder injection engine.

A catalyst temperature sensor 32 is provided with an air cleaner 23 purifying an intake air, an air flow sensor 24 measuring an intake air flow rate, an electronic control throttle 25 controlling the intake air flow rate, and a surge tank 26 suppressing a pulsation in an inner portion of the intake pipe.

Further, an air fuel ratio sensor 29 is attached to each of an assembled portion of a first cylinder and a fourth cylinder of the exhaust pipe 28 and an assembled portion of a second cylinder and a third cylinder, and an exhaust gas temperature sensor 30 is attached to a portion where all the exhaust pipes of the cylinders are assembled. Further, a downstream side of the exhaust gas temperature sensor 30 is provided with a catalyst 31 for purifying the exhaust gas, and a catalyst temperature sensor 32 measuring a temperature of the catalyst.

An engine control unit (hereinafter, refer to as an ECU 27) corresponds to a known microcomputer constructed by a microprocessor (CPU), a read only memory (ROM), a random access memory (RAM) and an input and output port which are connected to each other via a bidirectional bus.

Figure 5:
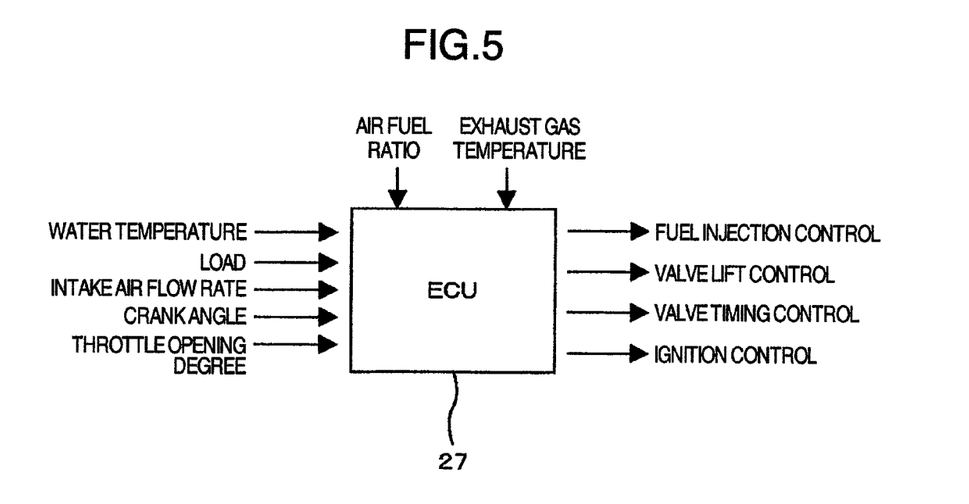
FIG. 5 is a view showing an engine control unit.

The ECU 27 is connected to various sensors such as to a crank angle sensor, a load sensor, the air flow sensor 24, a throttle opening degree sensor, a water temperature sensor, the air fuel ratio sensor 28 and the like which are attached to the cylinder injection engine 1, as shown in FIG. 5, and determines a state of the engine.

Further, in order to control a lift amount of the intake valve 9, a sensor detecting an angle of rotation of the control shaft 16 is connected to the ECU 27, and controls a driving motor (not shown) controlling the angle of rotation of the control shaft 16.

The ECU 27 is connected to the ignition plug 5, the injector 6, the variable lift mechanism 14 and the like, and carries out a fuel injection control, an ignition control and a valve control in conformity to the state of the engine.

Figure 6:
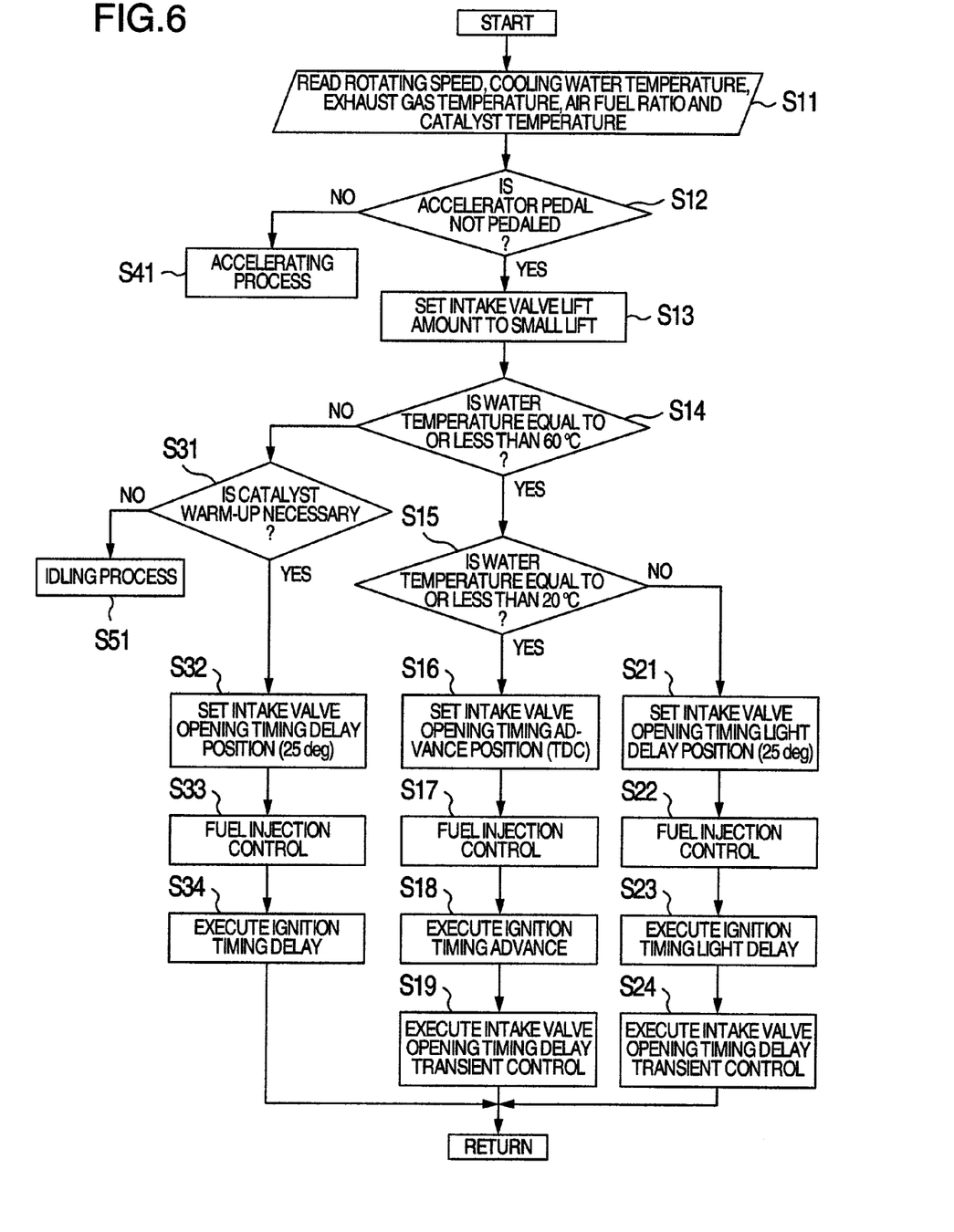
FIG. 6 is a flow chart showing one example of a control routine at a cold starting time.

The cylinder injection engine 1 in accordance with the present embodiment is structured as mentioned above, and a description will be given below of one example centering on a reduction of an HC generated in a so-called fast idle period until a catalyst warm-up operation is finished after an initial explosion at a time of a cold starting time, and a control routine of a catalyst early warm-up, on the basis of a flow chart in FIG. 6.

If the control is started, a step S11 reads an engine speed, a temperature of a cooling water, an exhaust gas temperature, an air fuel ratio and a catalyst temperature from the respective sensors attached to the cylinder injection engine 1.

Next, the step goes to a step S12, and the step S12 determines whether or not an accelerator pedal is pedaled. In the case that the accelerator pedal is pedaled, the step goes to a step S41, and an accelerating process control is executed. In the case that the step S12 determines that the accelerator pedal is not pedaled, the step goes to a step S13, and in order to make a lift amount of the intake valve 9 small, a driving motor controlling an angle of rotation of the control shaft 16 is controlled so as to come to a value of a lift amount mapped and stored in the ROM of the ECU 27, and the lift amount of the intake valve is set small. Next, the step goes to a step S14, and the step S14 determines whether a step S15 is executed or a step S31 is executed on the basis of the cooling water temperature read in the step S11. In the embodiment, the cooling water temperature is set to 60° C.

In the case that the cooling water temperature is higher than 60° C., it is determined that the cylinder injection engine 1 is not under the cold start, and the steps S31 to S34 or a step S51 is executed. A description will be in detail given of this later.

In the case that the step S14 determines that the cooling water temperature is equal to or less than 60° C., the step next goes to the step S15, and the step S15 determines whether or not the cooling water temperature is equal to or less than, for example, 20° C. In the case that it is determined that the cooling water temperature is equal to or less than 20° C., the step goes to a step S16. At this time, it is determined that the cylinder injection engine 1 is under the cold state, and a fast idle control is executed on the basis of the following procedure.

Figure 7:
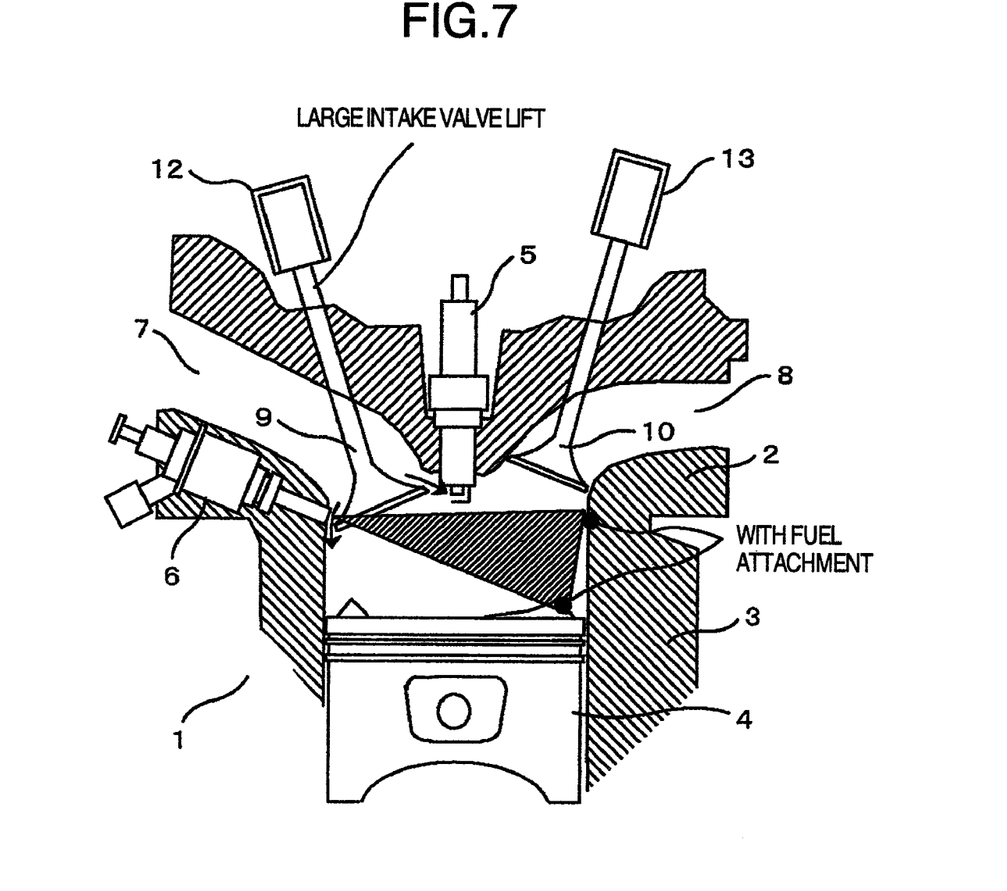
FIG. 7 is a view showing a behavior of a cylinder inside fuel at a time of a normal (large) lift of an intake valve.
Figure 8:
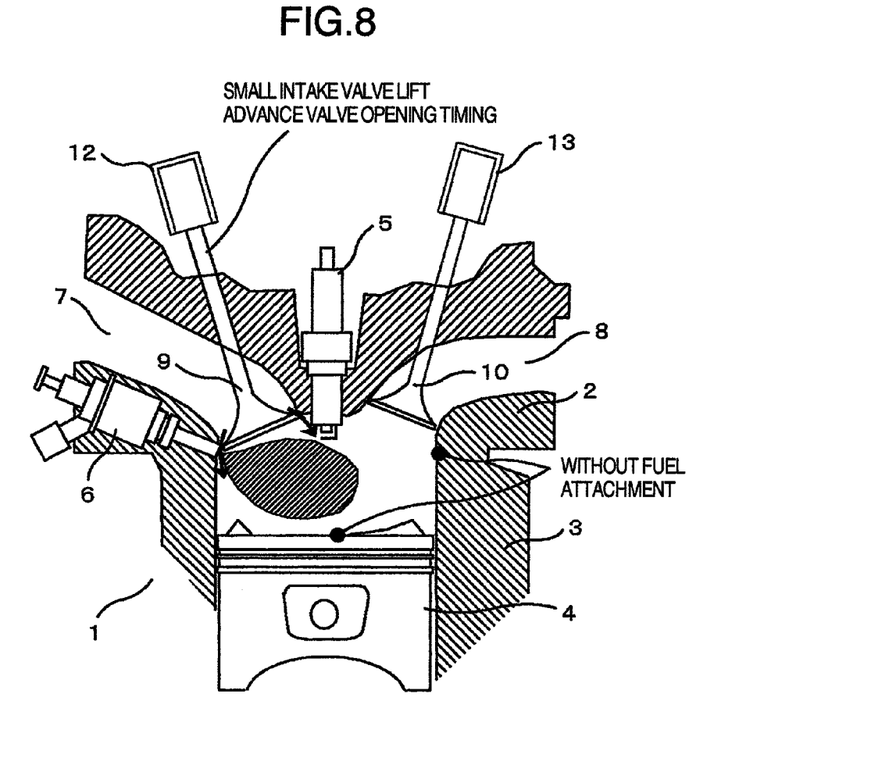
FIG. 8 is a view showing a behavior of the cylinder inside fuel at a time of a small lift of the intake valve and an advance of a valve opening timing.

In the step S16, a valve opening timing of the intake valve 9 is set to an advance position by a variable valve timing mechanism (not shown) in such a manner as to come to a value of the valve opening timing which is mapped and stored in the ROM of the ECU 27. In the present embodiment, the valve opening timing is set to an intake top dead center. Next, a fuel injection control is executed in a step S17. In this case, an injection timing and an injection period mapped and stored in the ROM of the ECU 27 are corrected on the basis of the values from the respective sensors, a driving current is input to the injector 6, and the fuel pressurized by the fuel pump is injected to the combustion chamber 11 in an intake stroke. At this time, since the intake valve 9 is set to the small lift, a speed of the intake air flowing near a nozzle leading end of the injector 6 becomes comparatively high. As a result, it is possible to inhibit the fuel from being attached to a wall surface of a cylinder bore in which the warm-up is not finished and a temperature is low. Further, the flow of the intake air heading for the piston direction is increased, however, since the nozzle leading end of the injector and the intake valve 9 are positioned close to each other, and a fuel spray near the nozzle leading end has a strong penetration force, it is possible to inhibit the fuel spray from being flowed by the intake air so as to be attached to the piston crowned face. Accordingly, since the intake air flow rate is low in a state in which the normal intake valve lift is large as shown in FIG. 7, the fuel is attached to the bore wall surface and the crowned face of the piston 4, it is possible to inhibit the fuel from being attached to the bore wall surface and the crowned face of the piston 4 as shown in FIG. 8 on the basis of the small lift of the intake valve 9 and the advance of the intake valve opening timing, and it is possible to reduce a wall flow causing the generation of the HC.

Next, the control routine goes to a step S18, and the step S18 selects the ignition timing which is mapped and stored in the ROM of the ECU 27, and the ignition is executed by the ignition plug 5.

Figure 1:
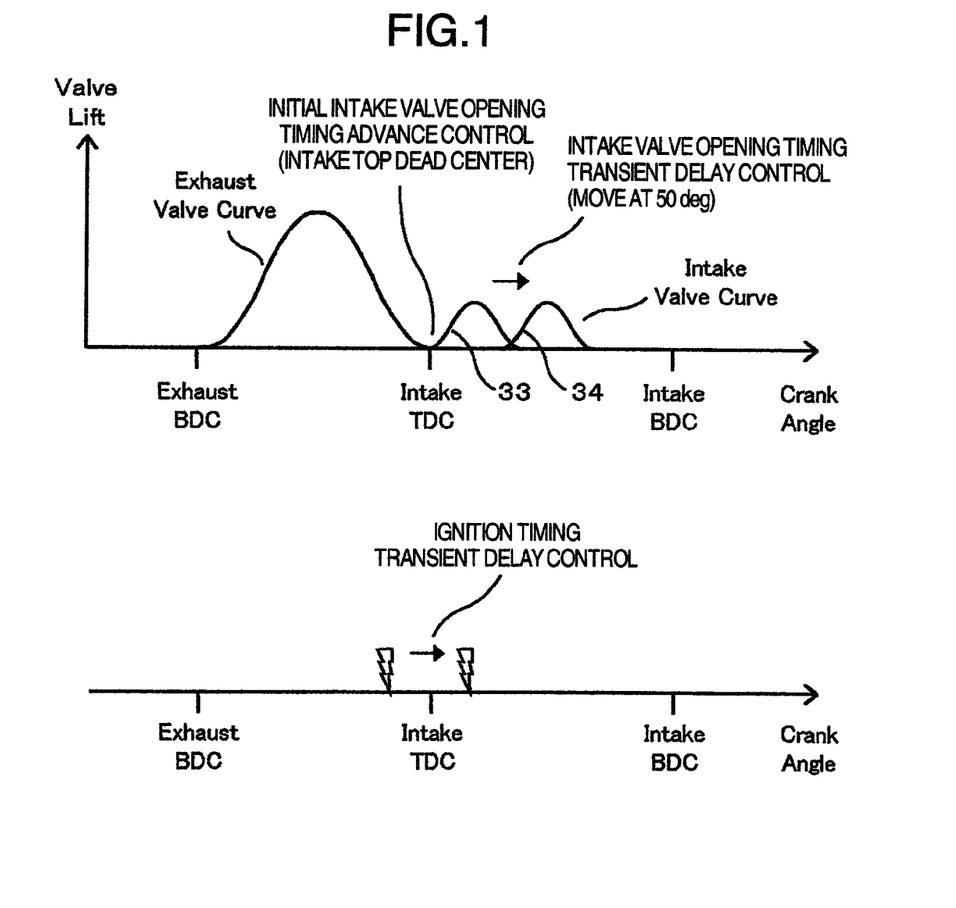
FIG. 1 is an explanatory view of an intake valve opening timing transient control at a cold starting time.
Figure 9:
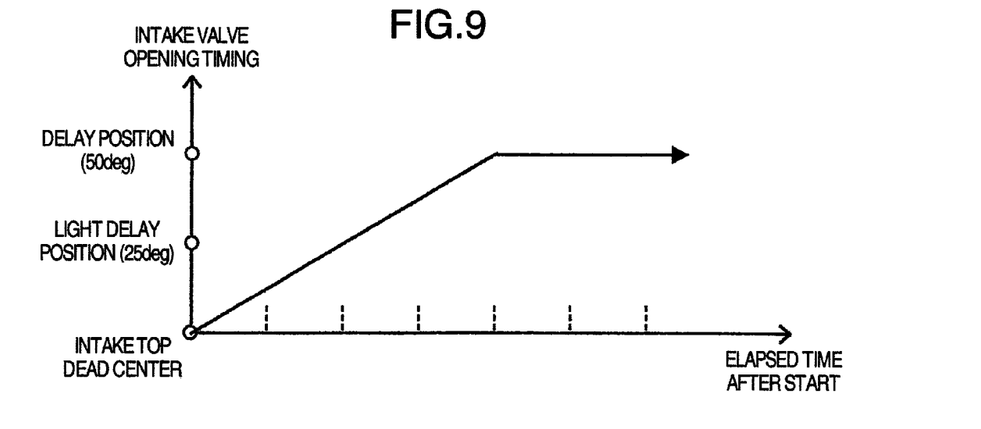
FIG. 9 is a view showing a time history of an intake valve opening timing transient control at a time of the cold starting time.

Next, the step goes to a step S19, and a transient control of the intake valve opening timing is executed. The step S19 will be described in detail by FIGS. 1 and 9. An intake valve lift curve in FIG. 1 is structured such that the valve opening timing set in the step S13 and the step S16 is the intake top dead center. The intake valve opening timing is transiently delayed in accordance with an elapsed time from the start of the engine, by a variable valve timing mechanism from this state. In the present embodiment, the delay position is set to 50 deg after the intake top dead center, and an intake valve lift curve 33 of the valve opening timing intake top dead center is moved to a position of an intake valve lift curve 34 at 50 deg after the valve opening timing intake top dead center. In FIG. 9, a horizontal axis shows a time from the start, and a vertical axis shows a position of the intake valve opening timing, and FIG. 9 shows a time history of the intake valve opening timing.

As mentioned above, since the bore wall surface and the piston crowned face are not warmed up at a time of the cold start, the generation of the HC is increased by the attachment of the fuel to the wall surface. Accordingly, it is necessary to carry out the intake valve control suppressing the fuel attachment on the basis of the small lift of the intake valve and the advance of the valve opening timing just after the cold start. In accordance with the elapsed time from the start of the engine, the warm-up of the combustion chamber 11 including the cylinder bore wall surface and the piston crowned face is promoted, however, since the catalyst exists in a downstream side of the exhaust pipe 28, it takes a long time to warm up the catalyst. For the early warm-up of the catalyst, there has been known a known technique which delays the ignition timing, oxidizes the fuel in an inner portion of the exhaust pipe 28 in addition to the combustion chamber 11, and raises the exhaust gas temperature. However, if the ignition timing is delayed, the combustion becomes unstable, the generating amount of the HC is increased, or an accidental fire is generated, thereby causing a reduction of the engine speed and a deterioration of the exhaust gas. In order to suppress an unstableness of the combustion caused by the delay of the ignition timing, the intake valve opening timing is transiently delayed in accordance with the elapsed time from the start, as shown in FIGS. 1 and 9. If the intake valve opening timing is delayed, the flow rate of the intake air is increased, a mixture of the fuel is promoted, and it is possible to improve a combustion stability. The combustion becomes unstable on the basis of the delay of the ignition timing, however, since the flow rate of the intake air is further increased on the basis of the delay of the valve opening timing, the mixture of the fuel spray is promoted, it is possible to suppress the unstableness of the combustion, and it is possible to achieve a significant reduction of the HC.

Figure 10:
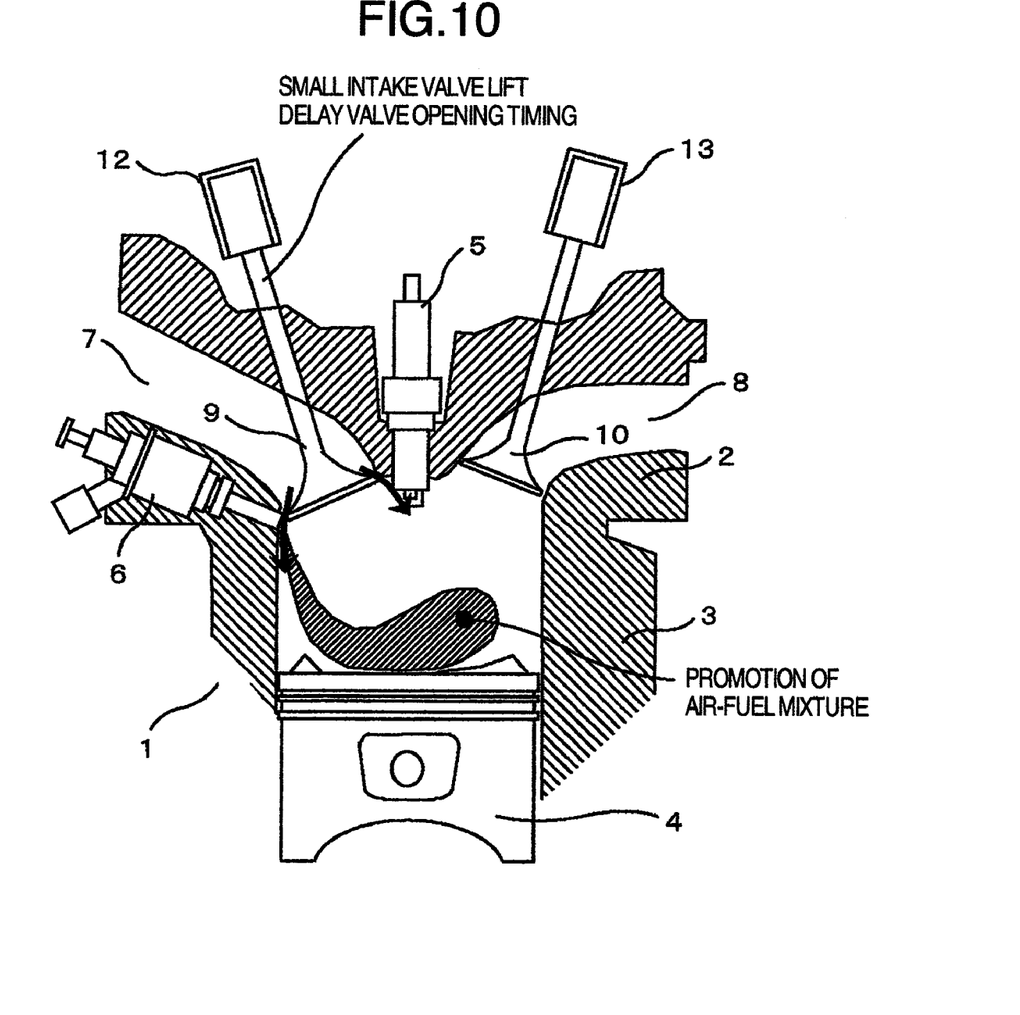
FIG. 10 is a view showing a behavior of the cylinder inside fuel at a time of a small lift of the intake valve and a delay of the valve opening timing.

On the other hand, the flow rate of the intake air heading for the piston direction becomes strong, and the fuel attachment to the piston crowned face is increased, however, since the fuel is vaporized even if the fuel is attached, by promoting the warm-up of the combustion chamber 11 including the piston crowned face, the HC is generated less. Since the warm-up of the combustion chamber 11 is promoted in accordance with the operating time of the engine, it is possible to suppress an influence of the fuel attachment to the piston crowned face while improving the combustion stability by transiently delaying the intake valve in conformity to the condition of the warm-up, whereby it is possible to achieve both the early warm-up of the catalyst and the reduction of the HC. The delay of the ignition timing can be transiently achieved in the same manner as the transient delay control of the intake valve. FIG. 10 shows a cylinder inner side at a time of carrying out the small lift of the intake valve and the delay control of the intake valve opening timing.

In the case that a step S15 determines that the water temperature is higher than 20° C., that is, the cooling water temperature is between 20° C. and 60° C., it is determined that the cylinder injection engine 1 is in a light cold state in which the warm-up of the combustion chamber 11 is finished in a comparatively early time. The light cold state is a state in which the generation of the HC caused by the fuel attachment is lower in comparison with the cold state, however, the generation of the HC is higher in comparison with the warm-up finish state.

In such a manner as to come to the value of the valve opening timing mapped and stored in the ROM of the ECU 27 in a step S21, the valve opening timing of the intake valve 9 is set to a light delay position existing between an advance position (0 deg) and a delay position (50 deg) by a variable valve timing mechanism. In the present embodiment, the light delay position is set to 25 deg after the intake top dead center. The fuel injection control and the ignition timing control which are optimum in the ECU 27 are executed in a step S22 and a step S23. Next, the step goes to a step S24, and the transient control of the intake valve opening timing is executed. The step S24 will be described in detail on the basis of FIGS. 11 and 12.

Figure 11:
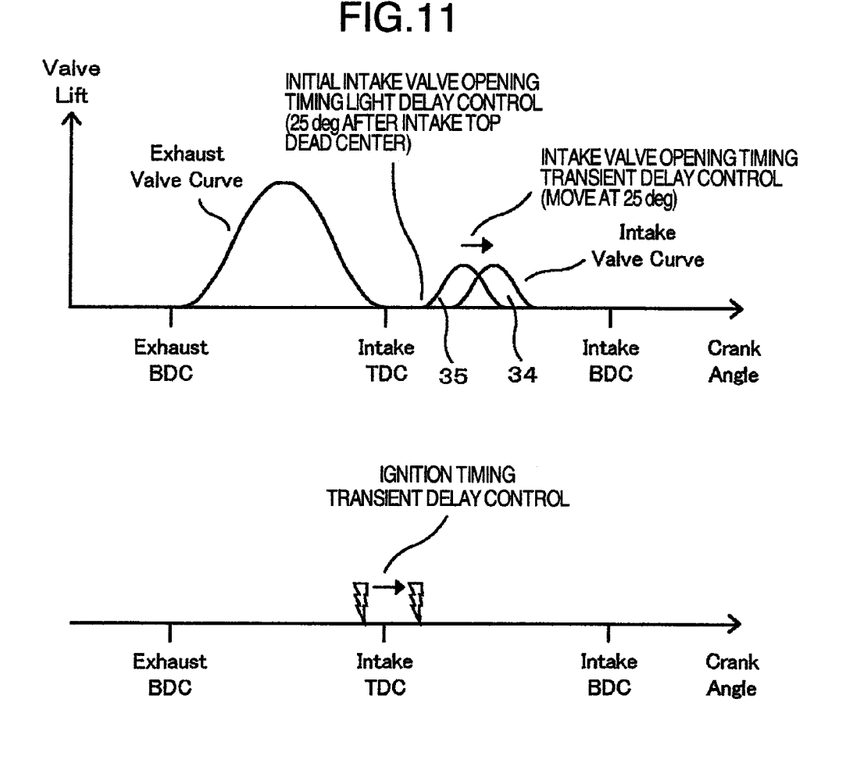
FIG. 11 is an explanatory view of the intake valve opening timing transient control at a time of a light cold starting time.
Figure 12:
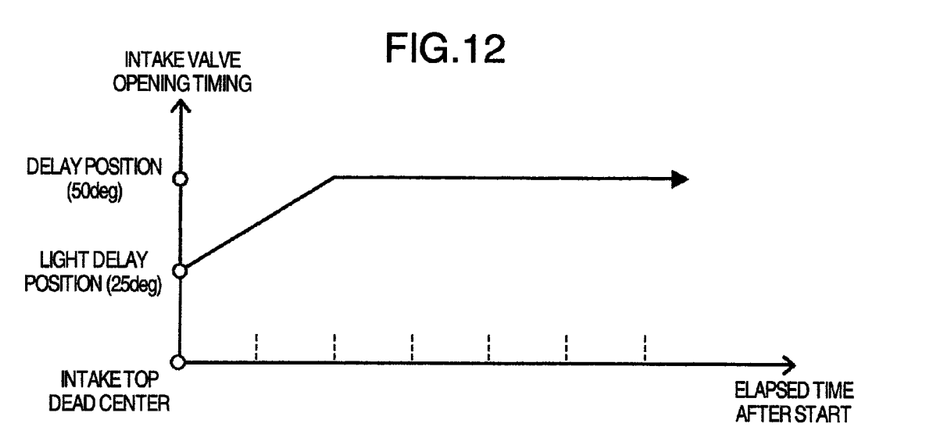
FIG. 12 is a view showing a time history of the intake valve opening timing transient control at a time of the light cold starting time.

An intake valve lift curve 35 in FIG. 11 is structured such that the valve opening timing set in the step S13 and the step S21 is 25 deg after the intake top dead center of the light delay position. The intake valve lift curve 35 of 25 deg after the valve opening timing intake top dead center is moved to the position of the intake valve lift curve 34 of 50 degree after the valve opening timing intake top dead center, by transiently delaying the intake valve opening timing in accordance with the elapsed time from the start, by the variable valve timing mechanism. FIG. 12 shows a time history of the intake valve opening timing, which is obtained by setting a time from the start to a horizontal axis, and setting a position of the intake valve opening timing to a vertical axis.

In comparison with the valve opening timing (the intake top dead center) of the intake valve lift curve 33 in FIG. 1, the valve opening timing of the intake valve lift curve 35 in FIG. 11 is set to the delay side at 25 deg. This is because the state of the cylinder injection engine 1 determined on the basis of the cooling water temperature is different, and is the light cold state in which the warm-up of the combustion chamber 11 is finished in the comparatively early time.

Figure 13:
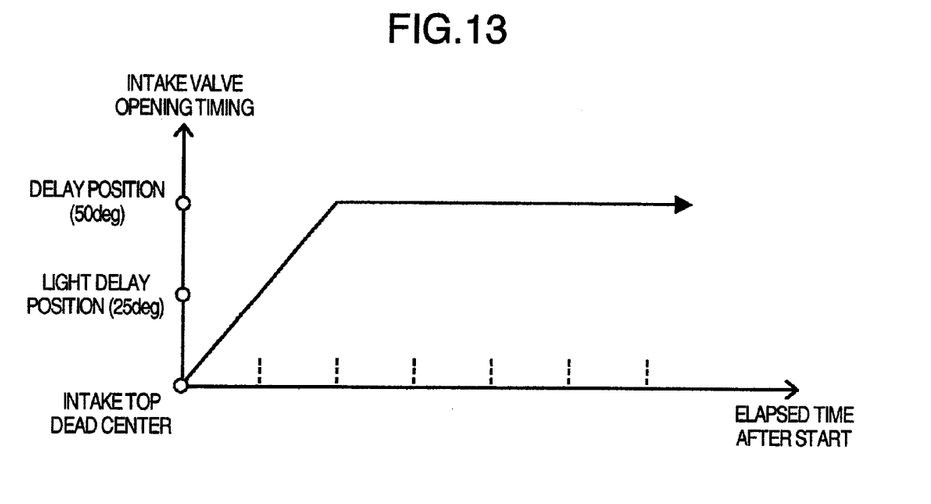
FIG. 13 is a view showing one example of the time history of the intake valve opening timing transient control at a time of the light cold starting time.

At a time of executing the intake valve transient control in the light cold state, the intake valve opening timing in the step S21 may be set to the same advance position (the intake top dead center) as the intake valve lift curve 33 in FIG. 1, thereby carrying out an intake valve opening timing control shown in FIG. 13 in which the speed of transiently delaying the valve opening timing is quickened.

In the case that the step S14 determined that the cooling water temperature is higher than 60° C., the step goes to the step S31, and determines on the basis of the value of the catalyst temperature sensor 32 attached to the catalyst 31 whether or not the warm-up of the catalyst is necessary. In the case that the warm-up is not necessary, the step goes to the step S51, and an idling process is executed. This corresponds to a case that the operation is restarted just after stopping the operation of the engine.

Figure 14:
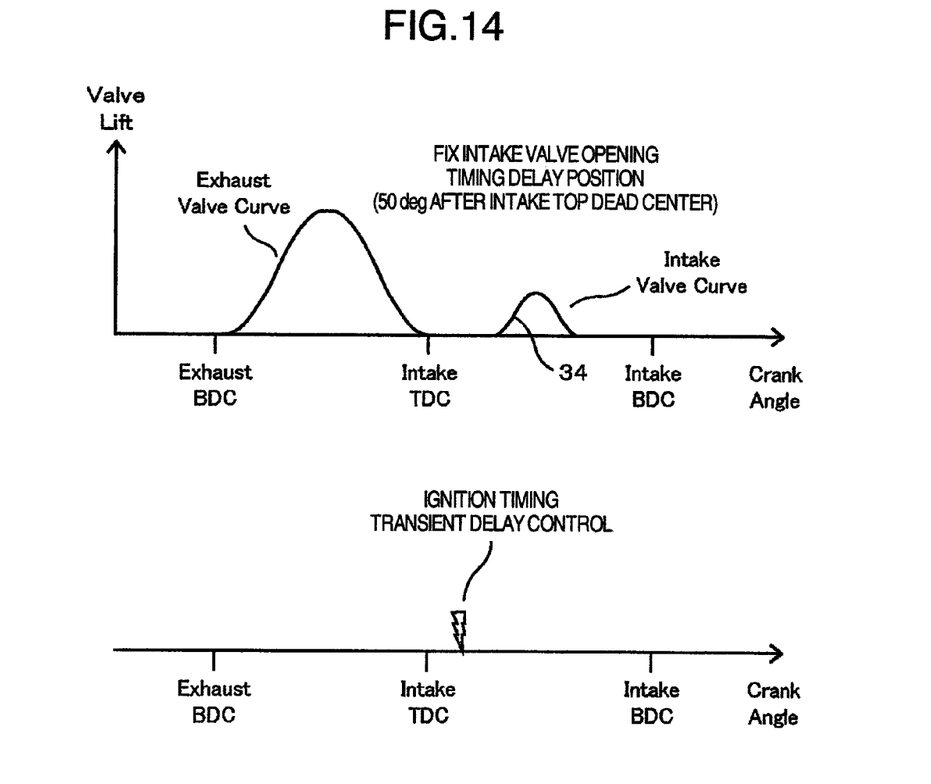
FIG. 14 is a view showing one example of an intake valve control at a time of executing a catalyst warm-up.
Figure 15:
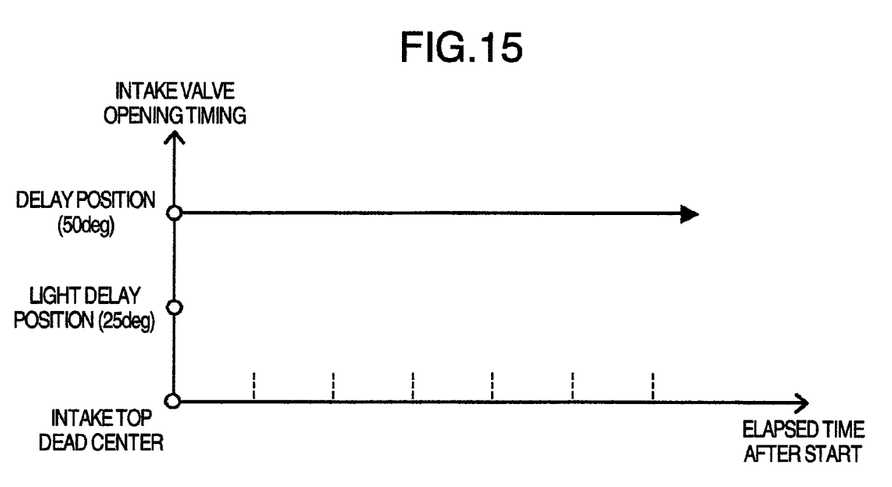
FIG. 15 is a view showing a time history of the intake valve control at a time of executing the catalyst warm-up.

In the case that the step S31 determined that the warm-up of the catalyst is necessary, the step goes to a step S32, and the catalyst warm-up control is executed. As shown in FIGS. 14 and 15, the opening timing of the intake valve is set to a delay position (50 deg after the intake top dead center) in the step S32, and the fuel injection control and the ignition timing control which are mapped and stored in the ROM of the ECU 27 are executed in a step S33 and the step S34. The intake valve opening timing at this time is set to the delay position of 50 deg after the intake top dead center as shown in FIG. 14, and is fixed to the delay position as shown in FIG. 15 until the warm-up of the catalyst is finished. The ignition timing is delayed in conformity to this.

In all the control routines including the transient control executing time of the intake valve opening timing in the step S19 and the step S24, the temperature of the catalyst 31 is always monitored by the catalyst temperature sensor 32, and the control routine is finished in the case that the temperature comes to the catalyst activating temperature, whereby the same idling process control as the step S51 is executed.

In the present embodiment, the initial intake valve opening timing is changed by dividing into the cold start and the light cold start, however, the speed of the transient delay of the intake valve opening timing may be controlled by determining the cold start in all the cases that the cooling water temperature is equal to or less than 60° C., executing only the routine of the steps S16 to S18 without carrying out the routine of the steps S21 to S24, and estimating the warm-up state within the cylinder by the exhaust gas temperature sensor 30.

In the present embodiment, the state of the engine is determined on the basis of the cooling water temperature in the step S14 and the step S15, and the initial valve opening timing of the intake valve is decided, however, the initial valve opening timing or the speed of the transient control of the valve opening timing delay may be decided by detecting the exhaust gas temperature by the exhaust gas temperature sensor 30 attached to the exhaust gas pipe 28 and determining the warm-up state of the combustion chamber 11.

It is possible to execute a divisional (multi-stage) injection control injecting the fuel in numbers in place of the injection of the fuel in one time during the intake stroke, in accordance with the delay of the intake valve opening timing at a time of executing the transient control of the intake valve opening timing.

At a time of stopping the operation of the engine, the lift amount of the intake valve is made small, and the intake valve opening timing is set to the advance side (the intake top dead center) so as to stop the operation. Accordingly, in the case of carrying out the cold start next time, it is possible to smoothly execute the intake valve transition control shown in the step S19 and the step S24.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A control apparatus controlling a cylinder injection type internal combustion engine directly feeding a fuel into a combustion chamber by a fuel injection apparatus attached to a portion near an intake valve, wherein the control apparatus controls the fuel injection apparatus so as to carry out an intake stroke injection, makes a lift amount of an intake valve smaller than a lift amount at a time of a high load, and controls such that an opening timing of the intake valve comes closer to an intake stroke side near an intake top dead center, in a fast idle period of the cylinder injection type internal combustion engine.

2. A control apparatus controlling a cylinder injection type internal combustion engine directly feeding a fuel into a combustion chamber by a fuel injection apparatus attached to a portion near an intake valve, wherein the control apparatus controls the fuel injection apparatus so as to carry out an intake stroke injection, makes a lift amount of an intake valve smaller than a lift amount at a time of a high load, and controls an opening timing of the intake valve in a first stage of a fast idle period so as to come closer to an advance side than a second stage of the fast idle period, in the fast idle period of the cylinder injection type internal combustion engine.

3. A control apparatus as claimed in claim 2, wherein the control apparatus controls the opening timing of the intake valve in the first stage of the fast idle period so as to come closer to the advance side than the second stage of the fast idle period, and thereafter controls in stages or continuously to a delay side in correspondence to an operating time of said internal combustion engine.

4. A control apparatus as claimed in claim 2, wherein said control apparatus varies an ignition timing by controlling an ignition apparatus, and delays the ignition timing as well as delaying the valve opening timing of the intake valve.

5. A control apparatus as claimed in claim 2, wherein the control apparatus decides the opening timing of said intake valve in correspondence to a water temperature.

6. A control apparatus controlling a cylinder injection type internal combustion engine directly feeding a fuel into a combustion chamber by a fuel injection apparatus attached to a portion near an intake valve, wherein said control apparatus controls said fuel injection apparatus so as to carry out an intake stroke injection, makes a lift amount of said intake valve smaller than a lift amount at a time of a high load, and controls an opening timing of said intake valve so as to come to 0 degree to 15 degree after an intake top dead center, in a fast idle period of said cylinder injection type internal combustion engine.

* * * * *